United States Patent
Mimamino

(10) Patent No.: US 7,426,061 B2
(45) Date of Patent: Sep. 16, 2008

(54) COLOR IMAGE PROCESSING DEVICE AND COLOR IMAGE PROCESSING METHOD

(75) Inventor: Katsushi Mimamino, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 660 days.

(21) Appl. No.: 10/967,565

(22) Filed: Oct. 18, 2004

(65) Prior Publication Data

US 2005/0094886 A1    May 5, 2005

(30) Foreign Application Priority Data

Oct. 30, 2003    (JP)    ............... 2003-371323

(51) Int. Cl.
*H04N 1/60* (2006.01)
*H04N 1/407* (2006.01)
*G06K 9/00* (2006.01)

(52) U.S. Cl. ............ 358/1.9; 358/518; 358/3.27; 382/254; 382/162; 382/167

(58) Field of Classification Search ............ 358/1.9, 358/504–540, 1.15, 402, 1.12, 1.13, 1.1, 358/1.2, 405, 407, 468, 3.27; 382/162–167, 382/254; 345/604; 347/19, 37, 40–43; 348/231.2, 348/231.3
See application file for complete search history.

(56) References Cited

U.S. PATENT DOCUMENTS

| | | | |
|---|---|---|---|
| 6,198,542 B1 * | 3/2001 | Tabata | 358/1.15 |
| 6,724,935 B1 * | 4/2004 | Sawada et al. | 382/167 |
| 6,814,420 B2 | 11/2004 | Fujita et al. | |
| 6,886,904 B2 * | 5/2005 | Otsuki | 347/19 |
| 7,016,058 B1 * | 3/2006 | Tabata | 358/1.15 |
| 7,016,076 B2 * | 3/2006 | Izumi | 358/1.9 |
| 2004/0056967 A1 * | 3/2004 | Ito et al. | 348/231.2 |

FOREIGN PATENT DOCUMENTS

| | | |
|---|---|---|
| CN | 1302149 A | 7/2001 |
| CN | 1410278 A | 4/2003 |
| JP | 63-240174 | 10/1988 |
| JP | 2003-037850 | 2/2003 |

OTHER PUBLICATIONS

Chinese language office action for corresponding Chinese application No. 2004100859276 lists the references above.

* cited by examiner

*Primary Examiner*—Edward L Coles
*Assistant Examiner*—Charlotte M Baker
(74) *Attorney, Agent, or Firm*—Hogan & Hartson LLP

(57) ABSTRACT

A color image processing device includes an input unit, an adjusting amount storage unit, a first conversion unit, a second conversion unit and an adjusting unit. The input unit inputs an adjustment substitute value to be selected for a color adjustment. The adjusting amount storage unit stores an adjusting amount corresponding to the adjustment substitute value for each color space including a first color space and a second color space. The first conversion unit converts the input image data into image data of the first color space. The second conversion unit converts the input image data into image data of the second color space. The adjusting unit adds an adjustment to the image data of the first color space and the second color space by using the adjusting amount for the color space of the converted image data. The adjusting amount is stored in the adjusting amount storage unit by being associated with the input adjustment substitute value.

21 Claims, 8 Drawing Sheets

BRIGHTNESS ADJUSTMENT

AFTER ADJUSTMENT

BEFORE ADJUSTMENT

ADJUSTMENT FUNCTION $y = x + b$
parameter: $b$
$(-1 < 0 < 1)$
when $b > 0$, light
when $b < 0$, dark ADJUSTING AMOUNT TABLE   b,Y COMPONENTS, L COMPONENT

|  | ADJUSTMENT SUBSTITUTE VALUE | YCC | Lab |
|---|---|---|---|
| LIGHT | +2 | 0.25 | 0.24 |
|  | +1 | 0.125 | 0.12 |
|  | 0 | 0 | 0 |
|  | −1 | −0.125 | −0.12 |
| DARK | −2 | −0.25 | −0.24 |

BRIGHTNESS ADJUSTMENT

ADJUSTMENT FUNCTION $y = x^\alpha$
parameter: $\alpha$
$(0 < \alpha)$
when $\alpha < 1$, light
when $\alpha > 1$, dark ADJUSTING AMOUNT TABLE    $\alpha$, Y COMPONENTS, L COMPONENT

|  | ADJUSTMENT SUBSTITUTE VALUE | YCC | Lab |
|---|---|---|---|
| LIGHT | +2 | 0.5 | 0.4 |
|  | +1 | 0.65 | 0.8 |
|  | 0 | 1 | 1 |
|  | −1 | 1.5 | 1.25 |
| DARK | −2 | 2 | 2.5 |

BRIGHTNESS ADJUSTMENT

ADJUSTMENT FUNCTION

$$y = x + \beta \sin\theta, \theta = \frac{\pi}{x}$$

parameter: $\beta$
($\beta$ is any number)
when $\beta > 0$, light
when $\beta < 0$, dark

ADJUSTING AMOUNT TABLE   $\beta$, Y COMPONENTS, L COMPONENT

|  | ADJUSTMENT SUBSTITUTE VALUE | YCC | Lab |
|---|---|---|---|
| LIGHT | +2 | 0.25 | 0.24 |
|  | +1 | 0.125 | 0.12 |
|  | 0 | 0 | 0 |
|  | −1 | −0.125 | −0.12 |
| DARK | −2 | −0.25 | −0.24 |

CONTRAST ADJUSTMENT

AFTER ADJUSTMENT y / BEFORE ADJUSTMENT x

ADJUSTMENT FUNCTION $y = ax + c$ c is decided in accordance with a parameter: a $(0 < a)$ when $a > 1$, high contrast when $a < 1$, lower contrast ADJUSTING AMOUNT TABLE    a, Y COMPONENTS, L COMPONENT

|  | ADJUSTMENT SUBSTITUTE VALUE | YCC | Lab |
|---|---|---|---|
| HIGH | +2 | 1.5 | 2.0 |
|  | +1 | 1.25 | 1.3 |
|  | 0 | 1 | 1 |
|  | −1 | 0.8 | 0.75 |
| LOW | −2 | 0.65 | 0.5 |

CONTRAST ADJUSTMENT

ADJUSTMENT FUNCTION $$y = x + \gamma \sin\theta, \theta = \frac{2\pi}{x}$$

parameter: $\gamma$
when $\gamma < 0$, high contrast
when $\gamma > 0$, low contrast ADJUSTING AMOUNT TABLE    $\gamma$, Y COMPONENTS, L COMPONENT

|  | ADJUSTMENT SUBSTITUTE VALUE | YCC | Lab |
|---|---|---|---|
| HIGH | +2 | −0.25 | −.024 |
|  | +1 | −0.125 | −0.12 |
|  | 0 | 0 | 0 |
|  | −1 | 0.125 | 0.12 |
| LOW | −2 | 0.25 | 0.24 |

FIG. 4A

| ADJUSTMENT FUNCTION | H: HUE   C: SATURATION |

Lab
$$C = \sqrt{a^2 + b^2} + \Delta C$$
$$H = \tan^{-1}\left(\frac{b}{a}\right) + \Delta H$$

YCC
$$C' = \sqrt{C_r^2 + C_b^2} + \Delta C'$$
$$H' = \tan^{-1}\left(\frac{C_b}{C_r}\right) + \Delta H'$$

← CONVERSION ADJUSTING AMOUNT

FIG. 4B

HUE ADJUSTMENT

ADJUSTING AMOUNT TABLE (HUE)

| ADJUSTMENT SUBSTITUTE VALUE | Lab $\Delta H$ | YCC $\Delta C'$ | YCC $\Delta H'$ |
|---|---|---|---|
| +180 | +180 | $C_1'$ | $H_1'$ |
| +135 | +135 | $C_2'$ | $H_2'$ |
| +90 | +90 | $C_3'$ | $H_3'$ |
| +45 | +45 | $C_4'$ | $H_4'$ |
| 0 | 0 | $C_5'$ | $H_5'$ |
| −45 | −45 | $C_6'$ | $H_6'$ |
| −90 | −90 | $C_7'$ | $H_7'$ |
| −135 | −135 | $C_8'$ | $H_8'$ |

FIG. 4C

SATURATION ADJUSTMENT

ADJUSTING AMOUNT TABLE (SATURATION)

| ADJUSTMENT SUBSTITUTE VALUE | Lab $\Delta H$ | YCC $\Delta C'$ | YCC $\Delta H'$ |
|---|---|---|---|
| +2 | $C_{11}$ | $C_{11}'$ | $H_{11}'$ |
| +1 | $C_{12}$ | $C_{12}'$ | $H_{12}'$ |
| 0 | $C_{13}$ | $C_{13}'$ | $H_{13}'$ |
| −1 | $C_{14}$ | $C_{14}'$ | $H_{14}'$ |
| −2 | $C_{15}$ | $C_{15}'$ | $H_{15}'$ |

$C_{13} = 0$

COLOR IMAGE PROCESSING DEVICE AND COLOR IMAGE PROCESSING METHOD

BACKGROUND OF THE INVENTION

1. Field of the Invention

The present invention relates to a color image processing device, and particularly to simplification of a configuration for carrying out a color adjustment of brightness, contrast, hue and saturation by a manual instruction.

2. Description of the Related Art

As a color image processing device, for example, a copy machine, a scanner, a printer, a facsimile machine and a multifunction peripheral having a combination of these machines are conventionally known. Such a conventional color image processing device generates Red, Green and Blue (RGB) data by using a scanner function.

With respect to a color adjustment of an image processing device, brightness, contrast, hue and saturation are items which can be adjusted easily by a human sense. On the contrary, a desired adjustment is difficult to be carried out for a color space of primary colors such as RGB and Cyan, Magenta and Yellow (CMY). A conventional color image processing device adjusts scanned colors after converting RGB data into Lab data (uniform color space data).

In a conventional color image processing device, a luminance color difference signal is input, a correction level of the color difference signal is instructed manually and by using conversion data corresponding to each of the color difference signals, a shift amount relating to each of the color difference signals is determined. The conventional color image processing device includes a correction unit for carrying out a correction process in accordance with the determined shift amount. The correction process is carried out in accordance with the shift amount relating to each of two digital color signals. However, this correction process only shifts the color difference signals for correcting a color temperature, and hue and saturation cannot be adjusted. In addition, brightness and contrast cannot be changed. Furthermore, it is necessary to store the conversion data for all of the color difference signals and a configuration results in being complicated.

As described above, the conventional color image processing device includes a function for converting the RGB data into the Lab data. The adjustment of the scanned colors is executed on the Lab data. In case of compressing and encoding data by a Joint Photographic Experts Group (JPEG) method, a function for converting the RGB data into YCC data (luminance color difference signal) is added to the color image processing device. In this case, to provide a color adjusting function of the YCC data, in addition to a color adjusting circuit of the Lab data, a color adjusting circuit of the YCC data becomes necessary and the configuration results in being complicated.

For example, a multifunction peripheral is required to output image data under three formats when printing out, when carrying out a facsimile transmission and when outputting as image data by using a scanner or the like. A color space which is appropriate or which is to be used in each of the formats has been decided. However, since the conventional color image processing device carries out an adjustment of the scanned colors on the Lab data, only one color adjusting circuit is provided. To carry out a color adjustment of the YCC data, it is necessary to add a circuit.

SUMMARY OF THE INVENTION

The present invention has been made in consideration to the above-described circumstances. An advantage of the present invention is to simplify a configuration for carrying out a color adjustment of a plurality of kinds of color spaces and carry out the color adjustment easily and reliably.

According to an aspect of the present invention, a color image processing device includes an input unit, an adjusting amount storage unit, a first conversion unit, a second conversion unit and an adjusting unit. The input unit inputs an adjustment substitute value to be selected for a color adjustment. The adjusting amount storage unit stores an adjusting amount corresponding to the adjustment substitute value for each color space including a first color space and a second color space. The first conversion unit converts the input image data into image data of the first color space. The second conversion unit converts the input image data into image data of the second color space. The adjusting unit adds an adjustment to the image data of the first color space and the second color space by using the adjusting amount for the color space of the converted image data. The adjusting amount is stored in the adjusting amount storage unit by being associated with the input adjustment substitute value.

According to the present invention, the adjusting unit can carry out the color adjustment of the image data of the first color space by using an adjusting amount of the first color space stored in the adjusting amount storage unit. The adjusting unit can carry out the color adjustment of the image data of the second color space by using an adjusting amount of the second color space stored in the adjusting amount storage unit. The color adjustment can be executed on the first color space and the second color space by one adjusting unit. When carrying out the color adjustment by using a circuit, it is not necessary to provide two circuits. As described above, according to the present invention, a configuration for carrying out the color adjustment of a plurality of kinds of color spaces can be simplified and the color adjustment can be carried out easily and reliably.

The first color space is typically the YCC (luminance color difference) color space. The second color space is typically the Lab (uniform color space) color space.

An adjustment item is preferable to include at least one of brightness and contrast. The adjusting unit carries out an adjustment by using a prescribed function on a luminance or a brightness signal in the image data of the first color space or the second color space. The first color space and the second color space can be adjusted by the same adjusting unit.

The adjustment item is preferable to include at least one of hue and saturation. The adjusting unit converts a color difference or a color component signal in the image data of the first color space or the second color space into a hue or a saturation signal. Then, as an adjusting process, the adjusting unit carries out an additional process of the adjusting amount. The first color space and the second color space can be adjusted by the same adjusting unit.

According to an aspect of the present invention, the color image processing device further includes a mode switching unit and a compressing and encoding unit. The mode switching unit switches between a first mode for processing the image data of the first color space and a second mode for processing the image data of the second color space. The compressing and encoding unit compresses and encodes the image data of the first color space. When the first mode is set, the input image data is converted into the image data of the first color space. Then, after adding an adjustment to the converted image data by using the adjusting amount, the adjusted image data is compressed and encoded and output. According to this aspect of the present invention, the data of the first color space can be processed preferably in accordance with the present invention and an output function of the compressed and encoded data can be presented.

According to an aspect of the present invention, the color image processing device further includes a mode switching unit and a conversion unit. The mode switching unit switches between a first mode for processing the image data of the first color space and a second mode for processing the image data of the second color space. The conversion unit converts the image data of the second color space into image data of a third color space. When the second mode is set, the input image data is converted into the image data of the second color space. Then, after adding an adjustment to the converted image data by using the adjusting amount, the adjusted image data is converted into the image data of the third color space and output. According to this aspect of the present invention, a function for preferably processing the data of the second color space in accordance with the present invention and converting the data of the second color space into the data of the third color space and outputting the data of the third color space can be presented. The third color space is a color space for an output process. For example, the third color space is an output color space for a printing process, such as the conventional Cyan, Magenta, Yellow and blacK (CMYK) color space. Accordingly, a printing function of the image data can be provided. The third color space can be an RGB color space.

As described above, according to the present invention, the color adjustment of a plurality of kinds of color spaces can be processed by a simple configuration and the color adjustment can be carried out easily and reliably. The present invention can present a preferable color adjusting technology to be applied in a color image processing device.

BRIEF DESCRIPTION OF THE SEVERAL VIEW OF THE DRAWINGS

FIG. 4A through FIG. 4C show adjustment functions and adjusting amount tables relating to a hue adjustment and a saturation adjustment.

DETAILED DESCRIPTION OF THE PREFERRED EMBODIMENTS

Embodiments of the present invention will be described with reference to the drawings. In the present embodiment, a first color space is a color space of a luminance color difference signal (YCC). A second color space is a uniform color space (Lab). A first mode is a scanner mode. A second mode is a copy mode.

Figure 1:
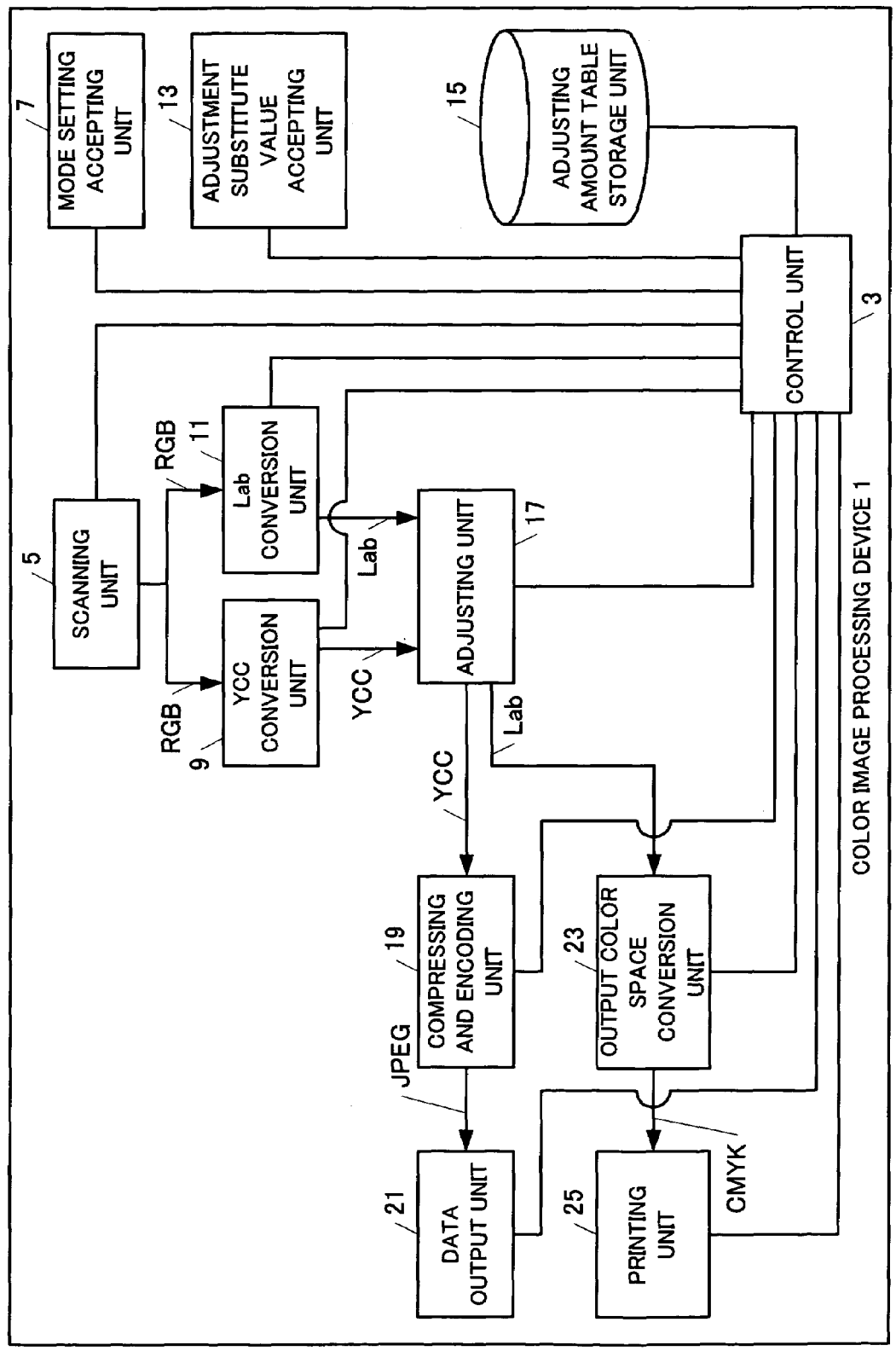
FIG. 1 is a functional block diagram showing a configuration of a color image processing device according to an embodiment of the present invention

FIG. 1 is a functional block diagram showing a configuration of a color image processing device 1. In the present embodiment, the color image processing device 1 is a multi-function peripheral having a copy function and a scanner function. FIG. 1 shows principal elements relating to the present invention. Although not shown in the drawing, the color image processing device 1 includes a configuration which a general copy machine or the like includes, such as an operation panel and a paper feed unit. The color image processing device 1 can also include a communication function such as a facsimile communication function, and a configuration for the communication function can be provided.

In the color image processing device 1 of FIG. 1, a control unit 3 controls various components shown in FIG. 1 and the entire color image process device 1.

A scanning unit 5 includes a scanner function. The scanning unit 5 scans an original document and generates color image data of a RGB format (hereinafter referred to as the "RGB data"). The scanning unit 5 functions as an input unit for inputting an image. In the present embodiment, the RGB data corresponds to image data to be input (input image data).

A mode setting accepting unit 7 accepts a mode setting input to the operation panel. When a user presses a scanner button, this operation is accepted as a scanner mode setting. When the user presses a copy button, this operation is accepted as a copy mode setting. The control unit 3 switches an operation mode in accordance with the mode setting accepted by the mode setting accepting unit 7.

A YCC conversion unit 9 converts the RGB data into color image data of a YCC format (hereinafter referred to as the "YCC data"). A Lab conversion unit 11 converts the RGB data into color image data of a Lab format (hereinafter referred to as the "Lab data"). Under the control of the control unit 3, when the scanner mode is set, the YCC conversion unit 9 functions and when the copy mode is set, the Lab conversion unit 11 functions.

An adjustment substitute value accepting unit 13 accepts an adjustment substitute value input to the operation panel by a manual operation. The adjustment substitute value accepting unit 13 functions as an input unit for inputting the adjustment substitute value. The adjustment substitute value is a parameter for a color adjustment and selected by the user. The adjustment substitute value is set so that the value can be recognized sensuously by the user. For example, the adjustment substitute value is set as "+2", "+1", "0", "−1" and "−2". As items of the color adjustment, "brightness", "contrast", "hue" and "saturation" are provided. In the present embodiment, the adjustment substitute value is common for the YCC color space (first color space) and the Lab color space (second color space).

The control unit 3 displays a plurality of selectable adjustment substitute values on the operation panel. A selection operation of the user is accepted by the adjustment substitute value accepting unit 13 via the operation panel and presented to the control unit 3.

The control unit 3 retrieves from an adjusting amount table storage unit 15, an adjusting amount corresponding to the adjustment substitute value. The control unit 3 presents the adjusting amount to the adjusting unit 17 so that the color adjustment is carried out by the adjusting unit 17.

As a feature of the present embodiment, the adjusting amount table storage unit 15 stores an adjusting amount corresponding to an adjustment substitute value for each of the YCC color space and the Lab color space. The control unit 3 retrieves an adjusting amount corresponding to the input adjustment substitute value and corresponding to the set mode. Then, the adjusting unit 17 receives an instruction of the control unit 3. When receiving the adjusting amount of the YCC color space, the adjusting unit 17 adjusts the YCC data. When receiving the adjusting amount of the Lab color space, the adjusting unit 17 adjusts the Lab data.

Figure 2A:
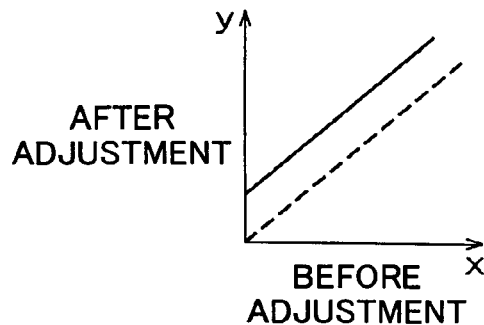
FIG. 2A through FIG. 2C show adjustment functions and adjusting amount tables relating to a brightness adjustment.
Figure 2B:
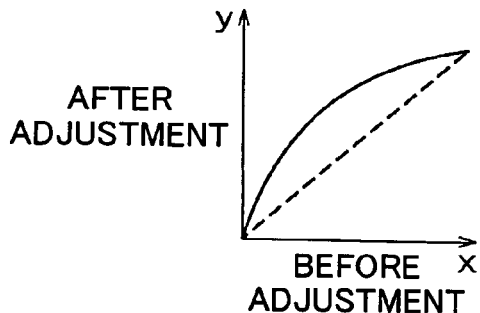
Figure 2C:
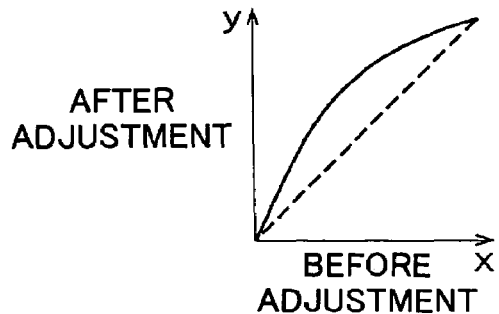

FIG. 2A through FIG. 2C show adjustment functions and adjusting amount tables relating to a "brightness" adjustment.

With respect to the brightness, a luminance signal (Y component) of the YCC data and a brightness signal (L component) of the Lab data are processed. As described above, in the present embodiment, the adjustment substitute value is common for the YCC color space (first color space) and the Lab color space (second color space). As shown in the drawings, the adjusting amount tables store adjusting amounts for each of the YCC color space (first color space) and the Lab color space (second color space) by associating to the common adjustment substitute values.

In an example shown in FIG. 2A, an adjustment function is $y=x+b$, and b is an adjusting amount. x is a value before the adjustment and y is a value after the adjustment. An input and an output are normalized between 0 and 1. In the adjusting amount table, for each of the adjustment substitute values, an adjusting amount of the Y component of the YCC data and an adjusting amount of L component of the Lab data are set.

The adjusting unit 17 includes a circuit for processing the adjustment functions shown in the drawings. The adjusting amount table storage unit 15 stores the adjusting amount tables shown in the drawings. When adjusting the YCC data, the adjusting amount of the Y component corresponding to the adjustment substitute value is retrieved and processed by the adjusting unit 17. When adjusting the Lab data, the adjusting amount of the L component corresponding to the adjustment substitute value is retrieved and processed by the adjusting unit 17. As described above, the adjusting unit 17 can be formed by a circuit for processing the same function ($y=x+b$) to adjust the YCC data and the Lab data.

FIG. 2B and FIG. 2C show other examples of the adjustment functions and the adjusting amount tables. In the examples shown in FIG. 2B and FIG. 2C, parameters $\alpha$ and $\beta$ included in the adjustment functions which are the adjusting amounts are used separately for the YCC data and the Lab data. Accordingly, the adjusting unit 17 can process the YCC data and the Lab data by a configuration for processing one function.

Figure 3A:
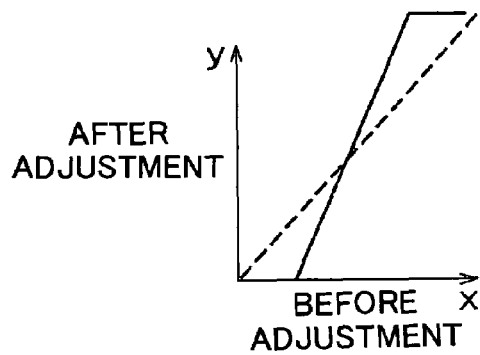
FIG. 3A and FIG. 3B show adjustment functions and adjusting amount tables relating to a contrast adjustment.
Figure 3B:
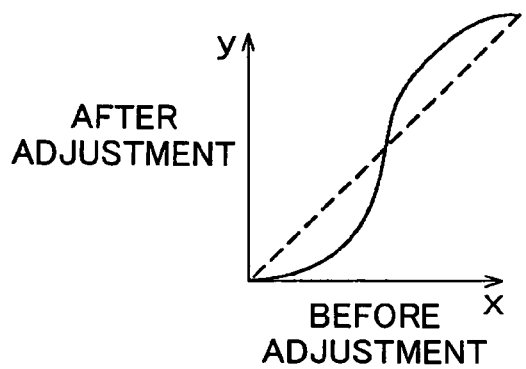

FIG. 3A and FIG. 3B show adjustment functions and adjusting amount tables relating to a "contrast" adjustment. With respect to the contrast, the luminance signal (Y component) of the YCC data and the brightness signal (L component) of the Lab data are processed.

In an example shown in FIG. 3A, an adjustment function is $y=ax+c$ and an adjusting amount is a slope (a). In the adjusting amount table, for each of the adjustment substitute values, an adjusting amount of the Y component of the YCC data and an adjusting amount of the L component of the Lab data are set. The two types of adjusting values are set in advance so that the adjustment results in an image become approximately the same (same for other adjusting amounts to be described later). The adjusting unit 17 includes a circuit for processing the adjustment function shown in the drawing. The adjusting amount table storage unit 15 stores the adjusting amount table shown in the drawing. When adjusting the YCC data, the adjusting amount of the Y component corresponding to the adjustment substitute value is retrieved and processed by the adjusting unit 17. When adjusting the Lab data, the adjusting amount of the L component corresponding to the adjustment substitute value is retrieved and processed by the adjusting unit 17. As described above, although the adjustment functions are different, from an aspect of the present invention, for the contrast adjustment, the adjusting unit 17 and the adjusting amount table storage unit 15 can be the same as the brightness adjustment.

FIG. 3B shows another example of an adjustment function and an adjusting amount table. Excluding the adjustment function, FIG. 3B is the same as FIG. 3A. In FIG. 3B, the adjustment function has an inflection point.

In the above-described examples, the adjustment function is a function having a straight line, a convex curved line projecting to an upper side or a lower side and an inflection point. However, the present invention is not limited to these examples.

FIG. 4A through FIG. 4C show adjustment functions and adjusting amount tables relating to a "hue" adjustment and a "saturation" adjustment. Here, a color difference signal of the YCC data and a color component signal of the Lab data are processed. A hue conversion and a saturation conversion are executed on these signals. An adjusting amount is added to the signals. Accordingly, the hue and the saturation are adjusted.

FIG. 4A shows the adjustment functions. With respect to the Lab data, the hue conversion and the saturation conversion are executed on the color component signal, and an adjusting amount is added. (In case of the hue adjustment, a saturation adjusting amount $\Delta C$ can be 0. In case of the saturation adjustment, a hue adjusting amount $\Delta H$ can be 0.) With respect to the YCC data, the hue conversion and the saturation conversion are executed on the color difference signal, and an adjusting amount is added. As shown in the drawing, the former is a processing of the color component signal, and the latter is a processing of the color difference signal. A common adjustment function is used.

FIG. 4B shows an adjusting amount table for the hue adjustment. For each of the adjustment substitute values, an adjusting amount $\Delta H$ of the Lab data and adjusting amounts $\Delta C'$ and $\Delta H'$ of the YCC data are set. As described above, the adjusting amount $\Delta C$ of the saturation of the Lab data can be 0. In the same manner as the example of the hue, the adjustment substitute value and the adjusting amount can be the same.

FIG. 4C shows an adjusting amount table for the saturation adjustment. For each of the adjustment substitute values, an adjusting amount $\Delta C$ of the Lab data and adjusting amounts $\Delta C'$ and $\Delta H'$ of the YCC data are set. As described above, the adjusting amount $\Delta H$ of the hue of the Lab data can be 0.

The adjusting unit 17 includes a circuit for processing the adjustment functions shown in the drawings. The adjusting amount table storage unit 15 stores the adjusting amount tables shown in the drawings.

When adjusting the hue of the YCC data, the adjusting amount of the hue adjustment of the YCC data corresponding to the adjustment substitute value is retrieved and processed by the adjusting unit 17 in accordance with the function shown in the drawing. When adjusting the saturation of the YCC data, the adjusting amount of the saturation adjustment of the YCC data corresponding to the adjustment substitute value is retrieved and processed by the adjusting unit 17 in accordance with the function shown in the drawing.

In the same manner, when adjusting the hue of the Lab data, the adjusting amount of the hue adjustment of the Lab data corresponding to the adjustment substitute value is retrieved and processed by the adjusting unit 17. When adjusting the saturation of the Lab data, the adjusting amount of the saturation adjustment of the Lab data corresponding to the adjustment substitute value is retrieved and processed by the adjusting unit 17.

As described above, in the present embodiment, the adjusting unit 17 can adjust the hue and the saturation of the YCC data and the Lab data by the circuit for processing the adjustment functions of FIG. 4A.

The adjusting amount table storage unit 15 and the adjusting unit 17 have been described. Referring to FIG. 1 again, the color image processing device 1 further includes a compressing and encoding unit 19, a data output unit 21, an output color space conversion unit 23 and a printing unit 25.

The compressing and encoding unit 19 compresses and encodes the YCC data by the JPEG format. The compressing and encoding process is carried out in accordance with the control of the control unit 3 when the scanner mode is set. The compressing and encoding process is executed on the above-described adjusted YCC data. The data output unit 21 outputs JPEG data. For example, the JPEG data is output to a personal computer via a Local Area Network (LAN) or a Universal Serial Bus (USB).

The output color space conversion unit 23 converts the Lab data into CMYK data for a printing process. The conversion process is carried out in accordance with the control of the control unit 3 when the copy mode is set. The conversion process is executed on the above-described adjusted Lab data. The printing unit 25 includes a printer function and carries out a printing process using the CMYK data.

The CMYK color space is an output color space for outputting and corresponds to a third color space of the present invention. However, the third color space is not limited to the CMYK color space. For example, the third color space can be an RGB color space as described in the following example. As another example of the present embodiment, for example, a scanning mode that is different from the above-described scanning mode is set as the second mode. Under the second mode, the output color space conversion unit 23 converts the Lab data, on which the color adjustment has been executed, into RGB data. For example, as data to be displayed, the RGB data is output from an output unit under a non-compressed state to a remote personal computer or the like. Further, as shown in this example, the output color space can be the same as the color space of the input image.

Figure 5:
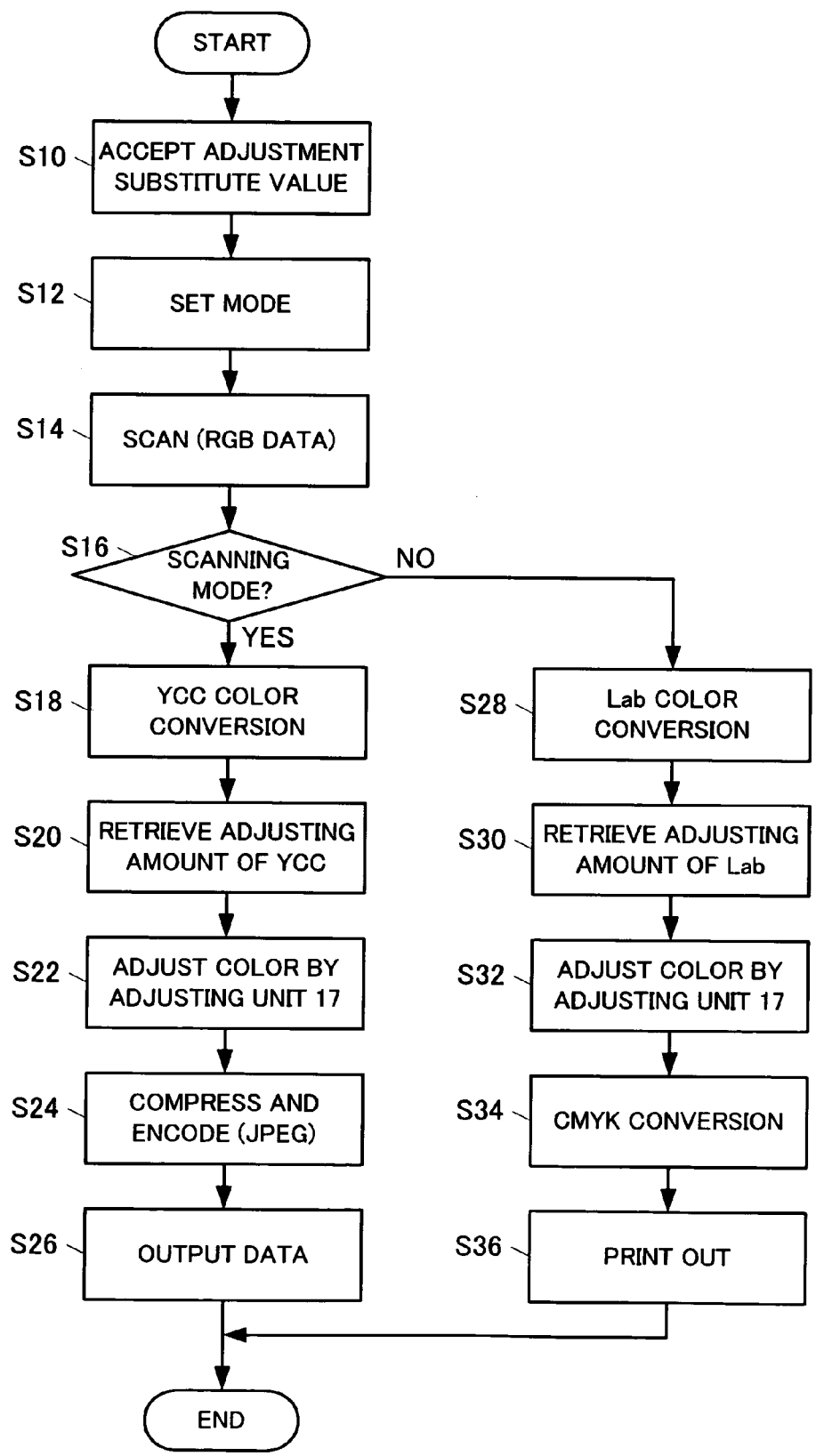
FIG. 5 is a flowchart showing an operation of the color image processing device according to an embodiment of the present invention.

FIG. 5 is a flowchart showing an operation of the color image processing device 1. When the user inputs an adjustment substitute value from the operation panel by a manual operation, the adjustment substitute value is accepted and transferred to the control unit 3 (step S10). In accordance with the mode setting accepted by the mode setting accepting unit 7, the control unit 3 sets the mode (step S12). When a scanning start instruction button is pressed by the user, the scanning mode is set. When a copying start instruction button is pressed, the copy mode is set.

The control unit 3 controls the scanning unit 5 to scan an original document and to generate the RGB data (step S14). The control unit 3 determines whether the scanning mode is set or the copy mode is set (step S16).

When the scanning mode is set, the control unit 3 controls so that the YCC conversion unit 9 converts the RGB data into the YCC data (step S18). Then, from the adjusting amount table storage unit 15, the control unit 3 retrieves the adjusting amount for the YCC data corresponding to the adjustment substitute value input at step S10 (step S20).

The control unit 3 sends the retrieved adjusting amount to the adjusting unit 17 so that the adjusting unit 17 adjusts the YCC data (step S22). The adjusting unit 17 has the above-described configuration for processing the adjustment function. The adjusting unit 17 receives the YCC data from the YCC conversion unit 9 and adjusts the YCC data by using the adjusting amount received from the control unit 3.

As the adjustment items, "brightness", "contrast", "hue" and "saturation" are set. At step S20, the control unit 3 retrieves the adjusting amount corresponding to the item input at step S10. The adjusting unit 17 also carries out a calculation process of the function corresponding to the input item. With respect to this point, the processing for the Lab data is carried out in the same manner.

At step S24, the adjusted YCC data is processed by the compressing and encoding unit 19 and the JPEG data is generated. The JPEG data is output from the data output unit 21 as a file of output data of the scanner (step S26).

Meanwhile, at step S16, when the control unit 3 determines that the copy mode is set, the control unit 3 controls so that the Lab conversion unit 11 converts the RGB data into the Lab data (step S28). Then, from the adjusting amount table storage unit 15, the control unit 3 retrieves the adjusting amount for the Lab data corresponding to the adjustment substitute value input at step S10 (step S30).

The control unit 3 sends the retrieved adjusting amount to the adjusting unit 17 so that the Lab data is adjusted by the adjusting unit 17 (step S32). The adjusting unit 17 receives the Lab data from the YCC conversion unit 9. By using the adjusting amount received from the control unit 3, the adjusting unit 17 carries out an adjusting process by the processing of the adjustment function that is the same as the adjusting process of the YCC data.

At step S34, the adjusted Lab data is processed by the output color space conversion unit 23 and the CMYK data is generated. By using the CMYK data, the printing unit 25 carries out a printing process (step S36).

As described above, in the present embodiment, the adjusting amount of the YCC data and the adjusting amount of the Lab data are used separately by using the information of the adjusting amount table storage unit 15. However, the circuitry of the adjusting unit 17 can be the same for processing the YCC data and for processing the Lab data.

As described above, according to the present invention, the image data of a plurality of color spaces can be adjusted by one adjusting unit. Accordingly, the configuration can be simplified and the color adjustment can be carried out easily and reliably.

As described in the above example, the present invention is especially advantageous in a device such as a multifunction peripheral in which the processing of a plurality of color spaces is requested.

The present invention has been described in its preferred embodiments. However, the present invention is not limited to the above embodiments, and it is to be understood by those skilled in the art that there are variations of the present invention without departing from the scope of the present invention.

What is claimed is:

1. A color image processing device, comprising:
   means for inputting an adjustment substitute value to be selected for a color adjustment;
   means for storing an adjusting amount corresponding to the adjustment substitute value for each color space including a first color space and a second color space;
   means for converting input image data into image data of the first color space;
   means for converting the input image data into image data of the second color space; and
   means for adjusting the image data of the first color space and the second color space by using the adjusting amount for the color spaces of the converted image data stored in the means for storing by associating the adjusting amount with the input adjustment substitute value,
   wherein an item adjusted by the means for adjusting includes at least one of brightness and contrast,
   wherein the means for adjusting is carried out in the first color space on the image data converted into the first color space and the means for adjusting is carried out in the second color space on the image data converted into the second color space.

2. The color image processing device according to claim 1, wherein the first color space is a color space of a luminance color difference signal and the second color space is a uniform color space.

3. The color image processing device according to claim 2, wherein the first color space is an YCC color space and the second color space is a Lab color space.

4. The color image processing device according to claim 1, further comprising:
means for switching between a first mode for processing the image data of the first color space and a second mode for processing the image data of the second color space; and
means for converting the image data of the second color space into image data of a third color space;
wherein when the second mode is set, the input image data is converted into the image data of the second color space, and after adding an adjustment to the converted image data by using the adjusting amount, the adjusted image data is converted into the image data of the third color space and output.

5. The color image processing device according to claim 4, wherein the second color space is a Lab color space and a third color space is a Cyan, Magenta, Yellow and blacK (CMYK) color space.

6. The color image processing device according to claim 1, wherein an item adjusted by the means for adjusting includes at least one of hue and saturation.

7. The color image processing device according to claim 6, wherein the means for adjusting converts a color difference signal or a color component signal in the image data of the first color space or the second color space into a hue or a saturation signal and carries out an addition process of the adjusting amount as an adjusting process.

8. The color image processing device according to claim 1, further comprising:
means for switching between a first mode which processes the image data of the first color space and a second mode which processes the image data of the second color space; and
means for compressing and encoding the image data of the first color space,
wherein when the first mode is set, the input image data is converted into the image data of the first color space, and after adding an adjustment to the converted image data by using the adjusting amount, the adjusted image data is compressed and encoded and output.

9. The color image processing device according to claim 8, wherein the first color space is an YCC color space and the means for compressing and encoding compresses and encodes the image data of the YCC color space under a Joint Photographic Experts Group (JPEG) method.

10. The color image processing device according to claim 1, wherein the means for adjusting carries out an adjustment on a luminance signal or a brightness signal in the image data of the first color space or the second color space by using a prescribed function.

11. A color image processing device, comprising:
an input unit that inputs an adjustment substitute value to be selected for a color adjustment;
an adjusting amount storage unit that stores an adjusting amount corresponding to the adjustment substitute value for each color space including a first color space and a second color space;
a first conversion unit that converts input image data into image data of the first color space;
a second conversion unit that converts the input image data into image data of the second color space; and
an adjusting unit that adjusts the image data of the first color space and the second color space by using the adjusting amount for the color spaces of the converted image data stored in the adjusting amount storage unit by associating the adjusting amount with the input adjustment substitute value,
wherein an item adjusted by the adjusting unit includes at least one of brightness and contrast,
wherein the adjusting unit carries out adjustment in the first color space on the image data converted into the first color space and carries out adjustment in the second color space on the image data converted into the second color space.

12. A color image processing method, comprising:
inputting an adjustment substitute value to be selected for a color adjustment;
inputting image data;
converting the input image data into image data of a first color space or a second color space;
retrieving from an adjusting amount storage unit, which stores an adjusting amount corresponding to the adjustment substitute value for each color space including the first color space and the second color space, an adjusting amount corresponding to the color spaces of the converted image data and corresponding to the input adjustment substitute value; and
adding an adjustment to the converted image data by using the retrieved adjusting amount,
wherein an adjustment item to be adjusted at the step of adjusting includes at least one of brightness and contrasts
wherein the adjustment to the converted image data of the first color space is carried out in the first color space, and the adjustment of the converted image data of the second color space is carried out in the second color space.

13. The color image processing method according to claim 12, wherein the first color space is a color space of a luminance color difference signal and the second color space is a uniform color space.

14. The color image processing method according to claim 13, wherein the first color space is an YCC color space and the second color space is a Lab color space.

15. The color image processing method according to claim 12, further comprising:
switching between a first mode for processing the image data of the first color space and a second mode for processing the image data of the second color space; and
converting the input image data into the image data of the second color space when the second mode is set, adding an adjustment to the converted image data by using the adjusting amount, converting the adjusted image data into image data of a third color space and outputting the image data.

16. The color image processing method according to claim 15, wherein the second color space is a Lab color space and the third color space is a Cyan, Magenta, Yellow and blacK (CMYK) color space.

17. The color image processing method according to claim 12, wherein an adjustment item to be adjusted at the step of adjusting includes at least one of hue and saturation.

18. The color image processing method according to claim 17, wherein at the step of adjusting, a color difference signal or a color component signal in the image data of the first color space or the second color space is converted into a hue or a saturation signal and an addition process of the adjusting amount is carried out as an adjusting process.

19. The color image processing method according to claim 12, further comprising:
switching between a first mode for processing the image data of the first color space and a second mode for processing the image data of the second color space; and
converting the input image data into the image data of the first color space when the first mode is set, adding an adjustment to the converted image data by using the adjusting amount, compressing and encoding the adjusted image data and outputting the image data.

20. The color image processing method according to claim 19, wherein the first color space is an YCC color space, and at the step of outputting, the image data of the YCC color space is output by being compressed and encoded under a Joint Photographic Experts Group (JPEG) method.

21. The color image processing method according to claim 12, wherein at the step of adjusting, by using a prescribed function, an adjustment is carried out on a luminance signal or a brightness signal in the image data of the first color space or the second color space.

* * * * *